March 24, 1964    F. K. H. NALLINGER    3,125,985
SPEED INDICATOR
Filed Oct. 17, 1960    2 Sheets-Sheet 1
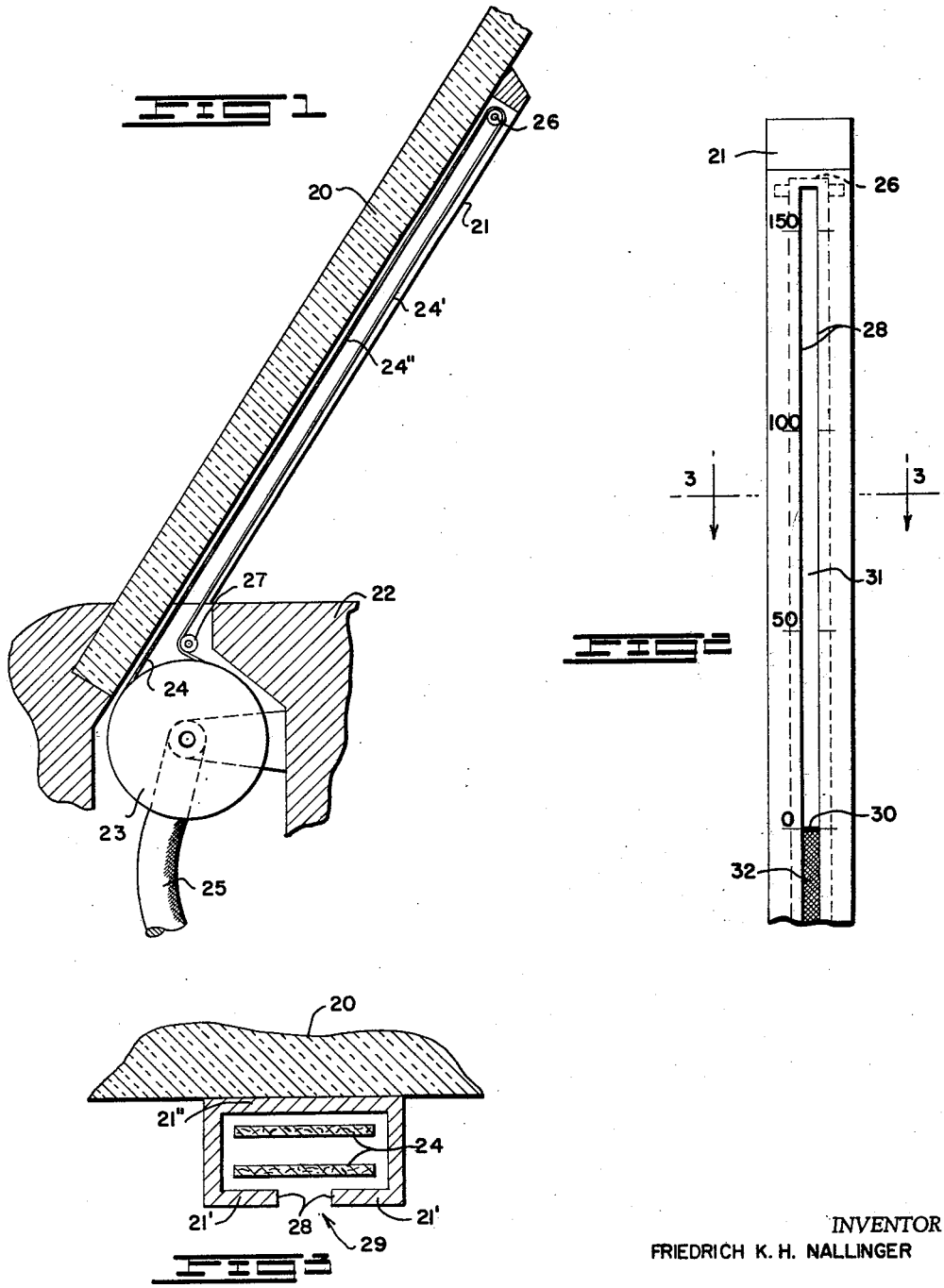
INVENTOR
FRIEDRICH K. H. NALLINGER
BY Dicke, Craig & Freudenberg
ATTORNEYS March 24, 1964 F. K. H. NALLINGER 3,125,985
SPEED INDICATOR
Filed Oct. 17, 1960 2 Sheets-Sheet 2
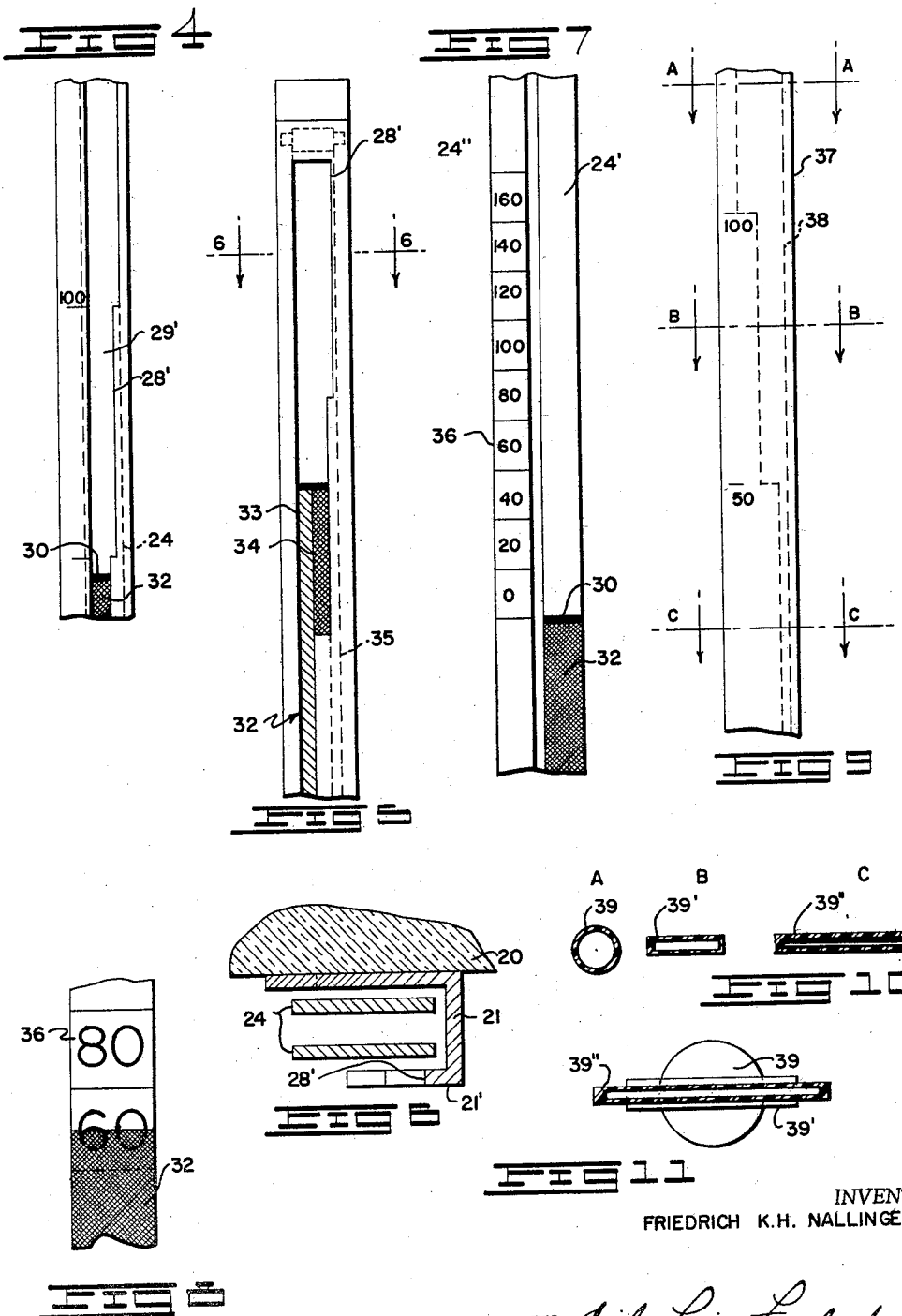
INVENTOR
FRIEDRICH K.H. NALLINGER
BY Dicke, Craig & Freudenberg
ATTORNEYS ing the tape or band on the outside thereof, both of these edge portions form an elongated indicator window.

A clearly visible line, preferably arranged on the upwardly moving portion of the tape or band serves as indicator mark which line extends transversely to the direction of movement thereof. However, this upwardly movable portion of the tape may also be subdivided into a neutral field and into an indicator field for purposes of constituting an elongated indicator column, preferably by the transversely extending indicator mark of different color. The indicator field and/or the edges of the indicator window may also be utilized, by the use of different colors and/or different configuration, for purposes of marking specific speed ranges.

In another construction according to the present invention, one portion of the tape, and more particularly the portion of the tape which moves upwardly with an increasing velocity carries the indicator mark of the indicator field whereas the scale is arranged on the other portion of the tape. This construction offers the advantages that the entire indicator range may be reduced in size so that it may be accommodated within a smaller portion of the field of vision of the driver.

The basic inventive concept may be further extended in such a manner that a transparent body is secured at the windshield as receiving or accommodating member which is provided with a tubular member for receiving, as indicator mark, a colored fluid rising correspondingly with the speed whereby the transparent body also accommodates or forms the scale. This further development in accordance with the present invention makes it possible to compress the indicating system into an extremely small space within the field of vision of the driver.

Consequently, the present invention is predicated on the basic concept to arrange at the windshield, within the field of vision of the driver, exclusively a movable indicator mark or indicator field with the corresponding scale whereas the drive for this indicator mark or indicator field is arranged, not at the windshield, as in the prior art, but in a manner invisible to the driver in the enclosure or frame for the windshield pane. It is also within the purview of the present invention to provide the speed indicator arrangement according to the present invention additionally to a normal conventional speedometer or tachometer arranged at the instrument panel and to construct the drive for the indicator system according to the present invention in such a manner as to be selectively disengageable from the conventional speedometer, whereby such disengageable feature can be obtained in any conventional manner in the drive connection between the conventional speed indicator and the indicator system according to the present invention, such drive connection being either in series or in parallel with the drive arrangement for the conventional speed indicator.

Accordingly, it is an object of the present invention to provide a speed indicating device which eliminates the disadvantages encountered with those devices of the prior art arranged within the field of vision of the driver.

Still another object of the present invention resides in the provision of a speed indicating device, arranged at the windshield of the motor vehicle which reduces to a minimum the loss in the field of vision by the presence of structural parts thereof.

A still further object of the present invention resides in the provision of a speed indicating device arranged within the normal field of vision for the driver in which the drive mechanism is hidden from the driver's view.

A still further object of the present invention resides in the provision of a speed indicating system arranged at the windshield of a motor vehicle in which a relatively small number of parts are used to effectively indicate to the driver the speed at which the vehicle is driven while at the same time assuring ready recognition, at a glance, of a particular speed prevailing at any time.

Another object of the present invention resides in the provision of a speed indicating device in which the movable indicator mark as well as the scale occupy as small as possible a space within the normal field of vision of the driver.

These and other features, objects and advantages of the present invention will become more obvious from the following description when taken in connection with the accompanying drawing which shows, for purposes of illustration only, several embodiments in accordance with the present invention and wherein FIGURE 1 is a transverse cross-sectional view through a speed indicating device in accordance with the present invention arranged at the windshield;

FIGURE 2 is an enlarged partial plan view of the speed indicating device of FIGURE 1 in accordance with the present invention;

FIGURE 3 is a cross-sectional view, on an enlarged scale, taken substantially along line 3—3 of FIGURE 2;

FIGURE 4 is a partial front elevational view of a modified embodiment of the speed indicator window for a speed indicating device operating on the principle of FIGURES 1 to 3;

FIGURE 5 is a partial front elevational view of still a further modified embodiment of an indicator window in accordance with the present invention with a speed indicating device also operating on the principle of FIGURES 1 to 3;

FIGURE 6 is a cross-sectional view, on an enlarged scale, taken substantially along line 6—6 of FIGURE 5;

FIGURES 7 to 9 are partial front elevational views of still further modified embodiments of the speed indicating device in accordance with the present invention;

FIGURE 10 are cross-sectional views, on an enlarged scale, through the tube, taken along lines *a, b* and *c* of FIGURE 9, respectively, which receives the indicator fluid and, FIGURE 11 is a cross-sectional view through a modified embodiment of a tubular member in accordance with the present invention receiving the liquid column serving as indicator mark.

Referring now to the drawing wherein like reference numerals are used throughout the various views thereof to designate corresponding parts, and more particularly to FIGURE 1, reference numeral 20 designates therein the windshield pane at which is securely arranged a guide member 21 in any suitable manner, for example by bonding, cementing or glueing. The guide member 21 extends at the bottom thereof to the rim portion or enclosure 22 disposed below the windshield pane 20. A driving drum 23 for an endless band or a tape 24 is arranged within the rim portion or enclosure 22, i.e., in a manner invisible from the outside thereof. The driving drum 23 is driven by a flexible shaft 25 from the vehicle, in a manner known per se, possibly in parallel or in series with a speed indicator of conventional construction and arranged at the instrument panel (not illustrated herein).

The endless band or tape 24 is guided at the top thereof around a reversing roller 26 which is supported within the guide member 21 and which has a relatively very small diameter. One or possibly several guide rollers 27 which may be spring-loaded in any conventional manner assure that both portions of the band or tape 24 are disposed as close as possible adjacent each other. The guide rollers 27 may also be used thereby for tensioning the tape 24. Additionally, the guide member 21 may also be extended up to the upper rim or enclosure of the windshield pane 20 so that the upper reversing roller 26 also becomes invisible from the outside thereof.

The guide member 21 according to FIGURES 2 and 3 surrounds the band or tape 24 on both sides thereof. Consequently, as seen from the side of the driver, both edges 28 of the guide member are disposed in front of the band or tape 24. Either one or both of these edges 28 thereby carry the scale. The tape 24 is constructed as narrow as possible, nevertheless it is always somewhat wider than the indicator window generally designated by reference numeral 29 and constituted by both edges 28.

The portion 24' of the band or tape 24 which moves upwardly with an increase in velocity is disposed in front as viewed from the driver's side and carries an indicator mark extending transversely to the direction of movement thereof, for example, in the form of a thick colored line. In that case, the band or tape 24 itself and the guide member 21 may be made of transparent material so that only the scale with the numbers and the indicator mark 30 itself are distinguishable or stand out from the windshield pane.

It is also, however, possible within the scope of the present invention to subdivide the portion 24' of the band or tape 24 into a neutral field 31 and into an indicator field 32. The neutral field 31 and the guide member 21 or at least the scale side 21' thereof facing the driver are thereby of the same color or they may also be transparent. The indicator field 32, in contradistinction thereto, distinguishes itself by a contrasting color whereby, as separating line a special indicator mark 30, possibly again of different color, may be provided.

With an increasing speed, the driving drum 23 rotates counterclockwise so that the portion 24' of the band or tape 24 moves upwardly corresponding to the increased velocity. The indicator mark 30 thereby indicates the prevailing velocity along the scale or the indicator field 32 forms an indicator column within the indicator window 29 which column extends upwardly by a distance corresponding to the velocity. However, it is also within the spirit of the present invention to arrange the tape 24 and guide member 21 in such a manner that the band or tape 24 is not surrounded by the guide member 21. In that case, only the securing part 21" of the guide member 21 would remain exclusively at the windshield pane 20 which, in that case, with a transparent band or tape 24, would have to accommodate the scale.

According to FIGURE 4, one of the edge portions 28' is set off in a step-like manner at predetermined speed values which are to be observed in particular. In this manner, an indicator window 29' is formed which has different widths for different measuring ranges, for example, for the range of 0 to 50 kilometers per hour, 50 to 100 kilometers per hour and for the range above 100 kilometers per hour. The indicator field 32 of the band or tape 24 thereby appears with a different width within each measuring range within the window 29'. As a result thereof, the supervision or observation of certain speed limits is considerably facilitated for the driver. The step-shaped configuration, however, may also be provided at both edges 28' of the indicator window 29.

According to the construction of FIGURES 5 and 6, the guide member 21 surrounds the band or tape 24 only on one side thereof. The edge 28' is again offset in a step-like manner as described hereinabove. The indicator field 32 is subdivided into longitudinally extending strips 33, 34 and 35 having different colors the width of which corresponds to the width of the step-shaped offsets at the edge 28'. Consequently, one indicator column appears in the lower measuring range whereas in the upper measuring ranges two or more parallel indicator columns of different color will appear. The forward portion 21' of the guide member 21 is thereby appropriately covered so as to be opaque up to the edge 28' thereof, for example, covered in white.

In the arrangement described hereinabove, the strip 33 may be green, the strip 34 orange, and the strip 35 red within the indicator field 32. In the position illustrated, for example, there appears within the center indicating range the relatively longer green indicator column and a relatively shorter orange indicator column alongside the same which are both visible to the driver. Upon exceeding the next speed range, which may be disposed, for example, at 100 kilometers per hour, a red indicator column would become visible additionally alongside thereof.

It is also within the scope of the present invention to widen the edges 28 or 28', not continuously in a step-like manner, but to accentuate only certain speed limits to be particularly observed inclusive the tolerance ranges thereof by wider cut-out portions, for example, in the arrangement of FIGURE 2. The range from 50 to 55 kilometers per hour may be marked, for instance, in the embodiment of FIGURE 2, by a corresponding cut-out portion in the edges 28 with respect to the relatively narrow window 29. An indicator column of different color and arranged alongside thereof may become visible in this cut-out portion, in a manner similar to that of FIGURE 5.

In the embodiments described hereinabove, the scale is provided on the stationary guide member in any suitable form whereas the upwardly movable portion 24' of the band or tape 24 carries the indicator mark or the indicator field. However, it is also within the purview of the present invention to arrange the scale on the other, i.e., on the downwardly movable portion 24" of the band or tape 24. An arrangement may be achieved in this manner such that for the same speed range and driving drum movement the indication thereof may be expanded to its double size and, therefore, can be read off with greater accuracy. Or, in the alternative, the driving drum and the tape movement may be reduced to one half and the apparatus can be arranged in an even more concentrated and compact manner within the field of vision of the driver so that it impedes even less the observation of the road.

Such an arrangement is shown, for example, in FIGURE 7 in which the two portions 24' and 24" of the band or tape 24 are disposed directly adjacent one another by appropriate guide and reversing roller means above and below the windshield pane. The drum 24' thereby carries the indicator mark 30 or an indicator field 32 in the manner already described hereinabove. The scale 36 is arranged on the other portion 24". With an increasing speed, the two portions 24' and 24" move relative to each other. With such an arrangement, the tape may be transparent whereas the scale 36 as well as the indicator mark 30 or indicator field 32 may be opaque, for example, of any suitable color.

This arrangement may also be so constructed according to FIGURE 8 that both portions of the transparent tape are disposed directly in front of one another. The scale 36 is thereby covered up to the prevailing measured value by the colored or opaque indicator field 32 corresponding to the prevailing speed. This arrangement offers the advantage of an extremely small construction.

A transparent receiving or accommodating member 37 is secured at the windshield pane according to FIGURE 9, for example, by bonding, cementing or gluing which accommodates or forms by appropriate means a tubularly-shaped hollow space 38. The cross-section of the hollow space 38 changes, as shown in FIGURE 10, from a circular shape 39 in the lower part $c$ thereof into a rectangular form 39' in the center part $b$ thereof and into a still wider rectangular shape 39" in the upper part $a$ thereof. The cross-sections 39, 39' and 39", however, are identical among each other insofar as the area thereof is concerned. The receiving body 37 again carries the scale indicia.

A colored liquid, for example, a red liquid is forced into the tubularly-shaped hollow space 38 from below by means of a pressure cylinder or the like which is changed in its volume by a movable piston corresponding to the velocity of the vehicle. Consequently, the liquid column rises within the tubularly-shaped hollow space 38 in dependence and proportion on the speed. The width thereby changes in the different measuring ranges. As a result of the equal cross-sectional areas of the tubularly-shaped hollow space 38, however, the same path for the liquid column remains for all identical speed differences in all measuring ranges.

According to FIGURE 11, the change in width of the liquid column serving as indicator may also take place symmetrically. It is thereby appropriate to construct the tubularly-shaped hollow space 38 altogether as narrow as possible in order to eliminate as much as possible the inertia effect for the liquid column, for example, during braking or acceleration. Of course, a tubular member having constant width may also be provided.

While I have shown and described several embodiments in accordance with the present invention, it is understood that the same is not limited thereto but is susceptible of many changes and modifications within the spirit and scope thereof and I, therefore, do not wish to be limited to the details shown and described herein, but intend to cover all such changes and modifications as are encompassed by the scope of the appended claims.

I claim:

1. A speed measuring device for vehicles having a windshield and an enclosure means for a rim thereof in which the speed measuring device is adapted to be arranged on the windshield in any desired location within the direct field of vision of the driver of the vehicle, comprising rectilinear speed indicating means forming a movable speed indicator mark, guide means effectively cooperating wtih said speed indicating means and forming with said speed indicating means a relatively small column secured to the interior surface of said windshield in said desired location within the direct field of vision of the driver of the vehicle, and drive means for said speed indicating means for effectively moving said speed indicator mark in dependence on the speed of the vehicle, said driving means being arranged within said enclosure means invisible to the driver to thereby reduce to a minimum the loss in the field of vision on the part of the driver.

2. A speed measuring device according to claim 1, wherein said indicating means and said guide means are the only parts arranged within the visible area of said windshield.

3. A speed measuring device according to claim 1, wherein said speed indicating means includes a carrier for the indicator mark, said guide means being arranged on said windshield with said carrier being movable essentially vertically within the field of vision of the driver.

4. A speed measuring device for vehicles, especially motor vehicles provided with a windshield pane and an enclosure means for the rim thereof in which the measuring device is secured to the interior surface of the windshield pane at any desired location within the field of vision of the driver, comprising speed indicating means and guide means for said speed indicating means forming together a relatively narrow column secured to the interior surface of said windshield pane in said desired location within the field of vision of the driver, said speed indicating means providing an essentially rectilinearly movable indicator mark and including carrier means in the form of a relatively narrow endless tape, and drive means for said speed indicating means for effectively moving the same in the rectilinear direction thereof in dependence on the speed of the vehicle, said driving means being arranged within the enclosure of said windshield pane to be invisible to the driver and including driving drum means arranged adjacent a rim portion of said windshield pane at one extremity of said tape and reversing roller means of comparatively smaller diameter to that of said driving drum means at the other extremity of said tape.

5. A speed measuring device according to claim 4, wherein said driving drum means is arranged adjacent the lower rim portion for the windshield pane.

6. A speed measuring device according to claim 5, wherein said guide means is extended into the enclosure means for the upper rim portion of said windshield and wherein said reversing roller means is invisibly arranged on said guide means adjacent the upper rim portion.

7. A speed measuring device according to claim 1, wherein said indicating means includes a tape having a tape portion rising with an increase in the speed which carries said indicator mark, and wherein the scale for said indicator mark is arranged at the other portion of said tape.

8. A speed measuring device according to claim 1, wherein said speed indicating means includes a tape having an upwardly movable portion and a downwardly movable portion with an increase in the speed, both of said portions being disposed directly in front of one another, and the forward portion of said tape being provided with said indicator mark while the rearward portion of said tape being provided with a scale.

9. A speed measuring device according to claim 1, further comprising a conventional speed indicating device arranged at the vehicle instrument panel, and disengageable means operatively connecting the last mentioned speed indicating device with the speed measuring device at said windshield pane.

References Cited in the file of this patent

UNITED STATES PATENTS

| | | |
|---|---|---|
| 2,430,690 | Spengler | Nov. 11, 1947 |
| 2,804,041 | Neugass | Aug. 27, 1957 |
| 2,961,230 | Moro | Nov. 22, 1960 |

FOREIGN PATENTS

| | | |
|---|---|---|
| 832,375 | Great Britain | Apr. 6, 1960 |

OTHER REFERENCES

German printed application 17,340, printed Feb. 9, 1956.